_United States Patent_ [19]

Felber et al.

[11] 4,428,429

[45] Jan. 31, 1984

[54] METHOD FOR SWEEP IMPROVEMENT UTILIZING GEL-FORMING LIGNINS

[75] Inventors: Betty J. Felber, Tulsa; Charles A. Christopher, Broken Arrow, both of Okla.

[73] Assignee: Standard Oil Company, Chicago, Ill.

[21] Appl. No.: 267,123

[22] Filed: May 26, 1981

[51] Int. Cl.³ .................. E21B 33/138; E21B 43/22
[52] U.S. Cl. ......................... 166/294; 166/270; 166/300
[58] Field of Search ............... 166/270, 273, 274, 275, 166/294, 300

[56] References Cited

U.S. PATENT DOCUMENTS

| | | | |
|---|---|---|---|
| 2,212,108 | 8/1940 | Zacher | 166/294 X |
| 2,402,588 | 6/1946 | Andresen | 166/270 |
| 3,136,360 | 6/1964 | Ramos et al. | 166/294 |
| 3,285,338 | 11/1966 | Boston | 166/273 X |
| 3,841,405 | 10/1974 | Moote et al. | 166/294 |
| 3,897,827 | 8/1975 | Felber et al. | 166/270 |
| 4,257,813 | 3/1981 | Lawrence et al. | 166/294 X |
| 4,313,500 | 2/1982 | Johnson, Jr. et al. | 166/275 |

FOREIGN PATENT DOCUMENTS

| | | | |
|---|---|---|---|
| 138907 | of 1961 | U.S.S.R. | 166/294 |
| 721522 | 3/1980 | U.S.S.R. | 166/294 |

_Primary Examiner_—Stephen J. Novosad
_Assistant Examiner_—George A. Suchfield
_Attorney, Agent, or Firm_—Scott H. Brown; Fred E. Hook

[57] ABSTRACT

Highly conductive zones of subterranean formations are treated with aqueous fluids containing gel-forming amounts of water-soluble basic lignins. Suitable treating fluids contain about 2 to about 8 wt. % sodium hydroxide solution. The lignin solutions gel within the formation due to reactivity with oil-water and/or the rock matrix. Alternately, following the injection of the gel-forming fluids, acidic gas is injected to cause gel formation.

17 Claims, No Drawings

METHOD FOR SWEEP IMPROVEMENT UTILIZING GEL-FORMING LIGNINS

FIELD OF INVENTION

The present invention related to the recovery of oil from underground reservoirs in which the reservoir permeability is highly non-uniform, resulting in inefficient sweep when such reservoirs are subjected to waterflood or gas flood operations and, more particularly, to a method concerned with improving the sweep efficiency by selectively reducing the permeability of the highly permeable zones in the rock matrix.

BACKGROUND OF THE INVENTION

One problem encountered in waterflooding and enhanced recovery projects is that particular reservoirs have highly conductive zones which accept disproportionate percentages of the crude oil displacing fluids. These conductive zones can be referred to as "thief zones". Additionally, in some reservoirs, the fluid conductivities of various permeable strata of the reservoir are so different that a high percentage of the injected fluid will be conducted through only a small percentage of the volume of the reservoir. In other reservoirs, a high percentage of the injected fluid will be conducted through natural or man-made fractures or other voids defined by the formation in which the reservoir is located. These sweep problems can significantly increase the quantity of treating fluid required to displace a high percentage of the crude oil from a reservoir.

PERTINENT PUBLICATIONS

Methods for plugging or reducing the rate of fluid movement in porous media makeup a substantial amount of technology, and include the in-place formation of gels. One current technique involves selective plugging using time set alkaline gels of sodium silicate. However, the time set range of these gels limits the treatment volumes. This limitation of silica solutions is particularly severe at temperatures above 170° F. because of the pronounced shortening of the gel times. Also, the presence of formation brines for the contact with acid media, such as $CO_2$, causes the silica solution to set prematurely. More over, the cost of silica solutions is such that their use in large volumes, e.g., at least 5000 barrels, is highly limited. A pertinent publication is illustrated by U.S. Pat. No. 3,897,827 by Felber, et al. which discloses a method for selective plugging of a porous media utilizing lignosulfonate gels activated by a mixture of dichromate in salt. The mixed accelerator lignosulfonate system possesses the specific advantage in addition to being economically feasible, of having sufficient long set times prior to gelation to allow use at temperatures characteristic of waterflooding and the like. However, the same compostions have an upper temperature limit of about 250° F., above which the gel time of the system decreases significantly to prohibit pore volume treatments at reasonable distances from the wellbore. Because of this limitation, the mixed accelerator method cannot be used in ultra-hot reservoirs, steam flooding operations, or insitu combustion techniques. Another pertinent publication in this area is illustrated by U.S. Pat. No. 2,402,588 by Andersen, which discloses a method of selectively sealing sand strata by the use of an alkaline sodium silicate solution followed by treatment with carbon dioxide gas to acidify the alkaline solution to precipitate the silica oxide. In addition, the divalent ion tolerance of the alkaline sodium silicate solution is quite low, thus limiting the reservoirs that it can be used in.

SUMMARY OF THE INVENTION

Conductive zones and subterranean formations are treated to reduce the conductivity of these zones. These zones are treated by injecting aqueous solution containing gel forming amounts of water-soluble basic lignins into the highly conductive zones. Suitable treatments contain about 2–10 wt % sodium lignin solution. The reactivity of the formation may cause the pH of the lignin solution to drop thus forming a permeability reducing gel. Also, following the injection of the solution into the formation the formation may be treated with an acidic gas flood to form the permeability reducing gel.

DETAILED DESCRIPTION OF THE PREFERRED EMBODIMENTS

It has been discovered that an aqueous fluid containing gel-forming amounts of a water-soluble basic lignin is satisfactory for reducing the fluid conductivity of highly conductive zones in subterranean reservoirs. Suitable water-soluble basic lignins are commercially available as aqueous solutions. Such lignin solutions are by-products of the Kraft process of pulp making where the mixtures of conifers and diciduous woods use in the process caused variations in the lignin solutions produced. The lignins are generally present as sodium lignins. One example of an aqueous pulping by-product basic lignin solution useful in the present invention is Kraft Black Liquor which has a pH of approximately 12, it contains sodium hydroxide, sodium sulfide and other sulfides. An aqueous treating fluid formulated with Kraft Black Liquor may contain insoluble salts that will need to be removed to prevent plugging the face of the formation into which the fluid is to be injected. In the formulation of this treating fluid, the concentration of the lignin solution, the curing temperature and the characteristics of the reservoir formation have all been found to be important factors in the strengths of the resulting gels. The concentration of the lignin solution in the treatment fluid can be adjusted to obtain the appropriate gel viscosity. The treating fluid should be formulated with sufficient lignins for gelation. This generally requires that the treating fluid contain a minimum of about 2 wt % lignin solution. The upper limit of the concentration of the lignin solution in a treating fluid is determined by the desired viscosity of the resulting gel. Suitable treating fluids can be formulated with a 10 wt % or higher lignin solution concentration. However, in the majority of instances, fluids containing about 2–8 wt % lignin solution should provide sufficient gel viscosity for reducing the conductivity of zones in the subterranean formations.

In order to predict the general trend of gelation strengths yielded by the treating fluids, it has been found that constant weight ratio to lignins will have variable gel strengths at differing formation temperatures. It has been found that the gel strengths generally increase with the increasing temperature of the formation.

In using the Kraft Black Liquor, the solution is injected into the injection well in such a manner that it selectively enters the pores of the depleted, more permeable strata, and the gelation of the lignins is induced. It has been found that the reactivity of certain formations will cause the lignins to gel, and the process hereof will be described below.

It has been found that as the solution moves through the formation and contacts the in-place oil and rock, that the sodium hydroxide is removed from the solution and the pH drops. When the pH reaches approximately 6.5-7.0, the lignin materials begin to precipitate, causing the blocking of the pore channels. Subsequent water in gas injection cycles will have more difficulty in moving in the channels where the lignin has precipitated, and these injected fluids will therefore move into previously unswept portions of the reservoir, displacing more oil toward the offset production wells.

The sodium hydroxide is lost to the reservoir by reaction with the acidic components of oil and with reaction with various components of the rock matrix. When sodium hydroxide reacts with the acidic components in the crude oil, surfactants are produced which can lower the interfacial tension between water and oil and thus increase the oil recovery. This may be an additional benefit of this invention; however, the majority of reservoirs do not contain significant quantities of acidic materials in the reservoir crude oil.

The largest loss mechanism in the formation is the reservoir rock. The silica components of sandstone reservoirs are acidic in nature and will react with caustic. However, the reaction is not limited to sandstone reservoirs since clays are present in many carbonate reservoirs than can also react with caustic. Caustic is alwo known to react with gypsum and anhydrite which are present in many reservoirs, as well as, any $CO_2$ or $H_2S$ in the water. This means that the present invention can probably be used to both sandstone and limestone reservoirs if clay components are present. In contacting the reservoir rock, it is more difficult in zones which contain high oil saturations and as such the reaction with the rock will cause the gel to precipitate prefenentially in zones with high water saturations. It has been further found that this system is known to be stable at temperatures up to almost 500° F. The most important feature of this process is that the gelation process is not time-dependent in that it is distance-dependent. Thus it has the potential for very deep penetration into the reservoir and very long pumping times. Further, there is no activator involved and the process does not depend upon contact of one fluid bank with another. Further, the material used is extremely inexpensive.

In the event that it is desired to form the gel more quickly than that which would take place by reaction with the oil and rocks within the formation or if the formation characteristics are such that the resulting gel would be weak, then injection of an acidic gas such as carbon dioxide, has been found to be a satisfactory reagent to cause the gelation of these lignin solutions. Process is carried out by injecting carbon dioxide gas into the well in such a manner that the gas selectively enters the pores which have already been penetrated by the lignin penetration. The gelation results from either of two occurrences. First, the carbon dioxide may dissolve in the solution to form carbonic acid and thus reduces the alkalinity of the lignin solution. The reduced pH then causes the lignins in the solution to gel. The second mechanism is that the $CO_2$ gas contacts the lignins directly and causes them to gel. It is believed that the primary mode of gelation is due to contact by the gas as the gelation occurs almost immediately. Suitable carbon dioxide treatments include about 10-110 moles of $CO_2$ per mole of water-soluble lignin present in the lignin solution.

With regard to the concentration of the Kraft Black Liquor solution that is injected, the following factors among others require consideration. The more concentrated the solution, the more viscous the gel subsequently formed from it will be. Therefore, a concentration of the solution should be selected that is high enough to obtain a sufficiency viscous gel. It should also be injected at a pressure below the fracturing pressure of the formation. The viscosity and density of the lignin solution injected is only slightly greater than that of water, and hence, the lignin solution can easily penetrate deep into the reservoir formation. As it is desirable to have the gel form in the rock matrix some distance from the wellbore, the concentration of the solution is also kept sufficiently low so that the formation of the gel by the carbon dioxide treatment is retarded near the wellbore. At higher concentrations, it is possible for the gel to form so near the wellbore, at which the carbon dioxide is introduced, so as to prevent the penetration by the carbon dioxide into the solution in the pores further removed from the wellbore. As is known in the art of sweep improvement, it is also possible to displace the aqueous lignin solution away from the sand face of the formation enough to avoid this problem.

It has been found that a Kraft Black Liquor solution selected for forming an aqueous solution is preferred to be about 35-63% solids, the solids comprising lignins, sodium sulfonates, sodium hydroxide and ash. The preferred range for the Kraft Black Liquor selected for this formulation is 50-60% solids. Kraft Black Liquor selected for this formulation should be that Black Liquor recovered from a multi-effective evaporation or direct contact evaporation in a typical Kraft process for pulp making.

Lignin solutions, in particular, Kraft Black Liquors, are tolerant of various salts or brine solutions and such solutions may contain up to about 100,000 ppm sodium chloride. Alternately, it may contain about 10,000 ppm calcium chloride. Higher concentrations of Liquor solution in the treating solution allow higher concentrations of salt. For example, 10 wt % Black Liquor solution has been soluble in up to 14,000 ppm calcium chloride, up to 28,000 ppm magnesium chloride, and up to 88,240 ppm sodium chloride.

Additional advantages to the use of this formulation is the solution tolerance for concentrations at 5,000 ppm or more of calcium chloride in temperature tolerance to about 500° F. Gels formed with sodium silicate can only tolerate approximately 100 ppm calcium chloride. A dichromate activated lignosulfonate can only tolerate a temperature of approximately 250° F. Further, polymers useful for sweep improvement contain too large a molecule to penetrate through the rock matrix which may have a permeability below 10 md, whereas the solution of this invention may penetrate a rock matrix having a permeability such that it can be penetrated by water.

Whereas the present invention has been adequately described, it should be understood that other further modifications, apart from those shown or suggested herein, may be made within the scope and spirit of this invention.

What is claimed is:

1. A method of treating a subterranean oil bearing formation penetrated by at least one injection well, and having at least one highly conductive zone therein, comprising injecting into said zone an aqueous solution containing gel-forming water-soluble basic lignins, such that as said aqueous solution moves through said zone the pH of said aqueous solution is reduced causing said aqueous solution to gel over a substantial distance from said injection well to reduce the permeability of said zone.

2. Method of claim 1 wherein a gel is formed more quickly from said aqueous solution after injection into said injection well by injecting an acidic gas into said zone to contact with said solution.

3. Method of claim 2 wherein said method is utilized in a gas flood project.

4. Method of claim 2 wherein said aqueous solution contains about 2–10 wt % lignin solution.

5. Method of claim 4 wherein said aqueous solution contains about 2–8 wt % lignin solution.

6. Method of claim 2 wherein the acidic gas is carbon dioxide.

7. Method of claim 6 wherein the mole ratio of carbon dioxide to lignins is about 10:1 to about 110:1.

8. Method of claim 2 wherein the acidic gas is $H_2S$.

9. Method of claim 1 wherein said method is utilized in a water flood project.

10. Method of claim 1 wherein formation of said gel occurs by reaction with reservoir components.

11. Method of claim 1 wherein said lignin solutions are Kraft Black Liquor.

12. A method of treating a subterranean oil bearing formation penetrated by at least one injection well, and having at least one highly conductive zone therein, comprising injecting an aqueous solution containing gel-forming water-soluble basic lignins into said zone to reduce the permeability of said zone, and injecting an acidic gas into said zone to contact with said solution.

13. Method of claim 12, wherein said method is utilized in a gas floor project.

14. Method of claim 12, wherein said aqueous solution contains about 2–10 wt % lignin solution.

15. Method of claim 14, wherein said aqueous solution contains about 2–8 wt % lignin solution.

16. Method of claim 12, wherein the acidic gas is carbon dioxide.

17. Method of claim 16, wherein the mole ratio of carbon dioxide to lignins is from about 10:1 to about 110:1.

18. Method of claim 12, wherein the acidic gas is $H_2S$.